Aug. 13, 1935.    J. A. WILLOUGHBY    2,010,833
RADIO NAVIGATING SYSTEM
Original Filed Jan. 19, 1929    3 Sheets-Sheet 1
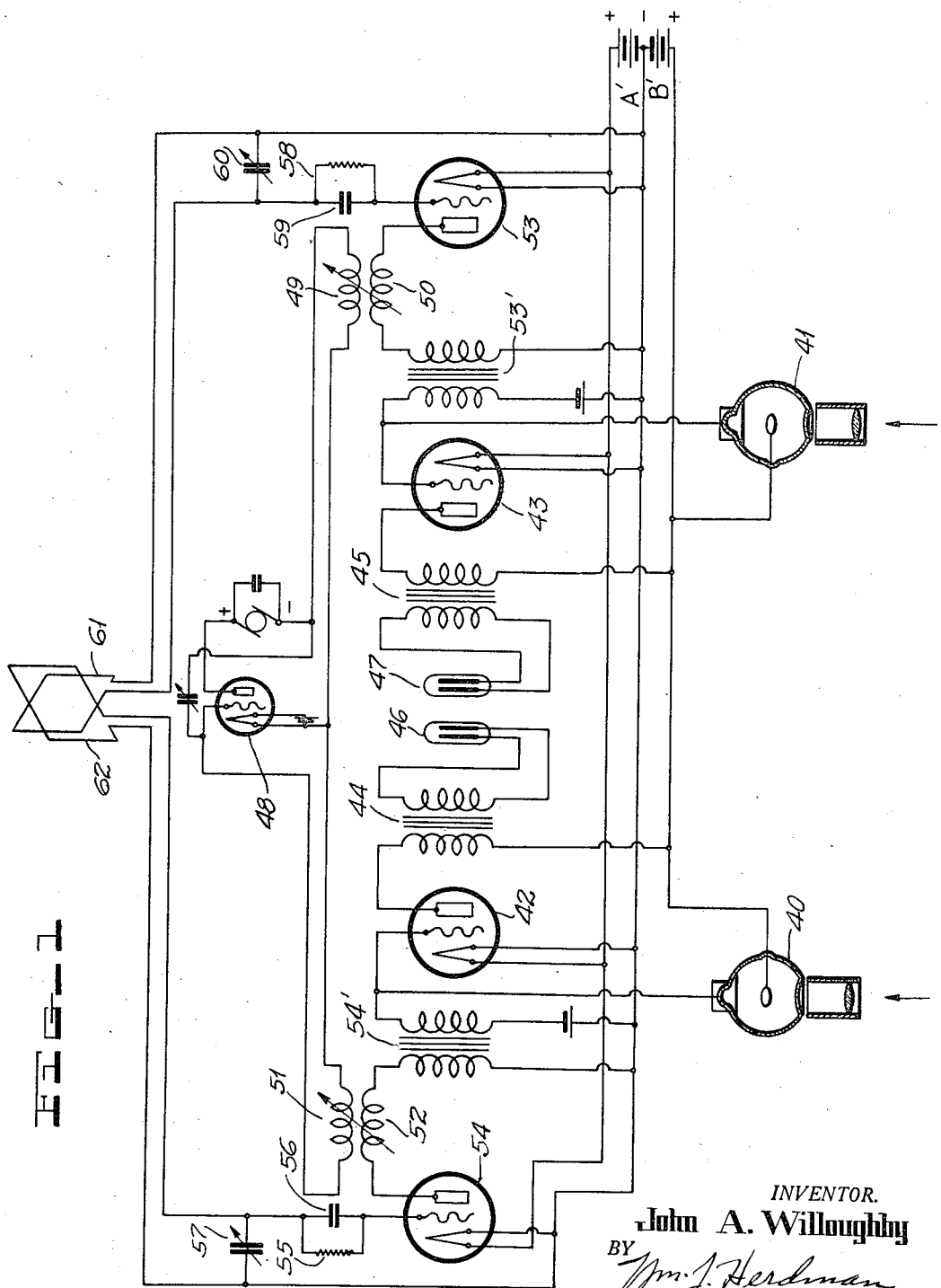
INVENTOR.
John A. Willoughby
BY
Wm. J. Herdman
ATTORNEY

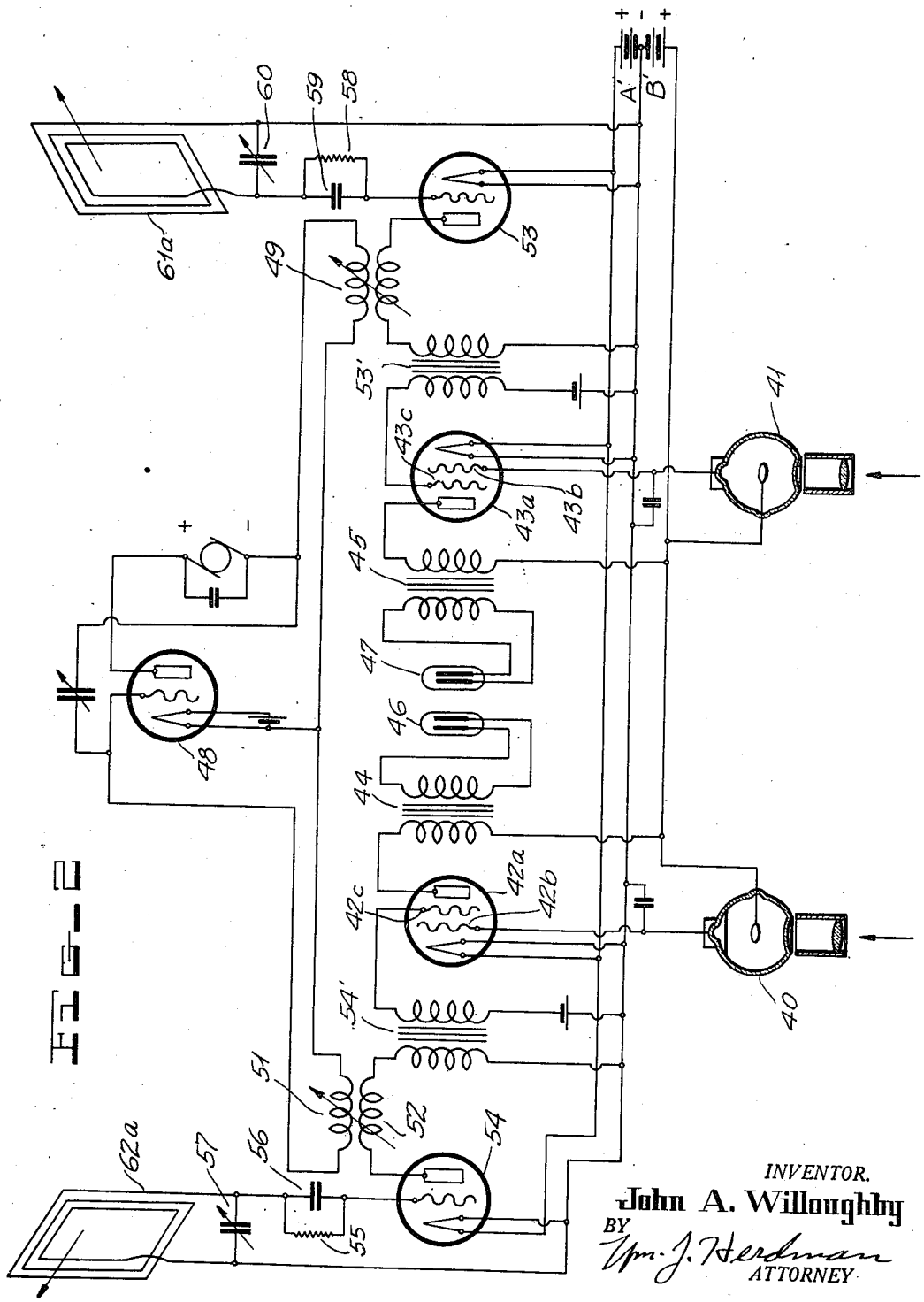

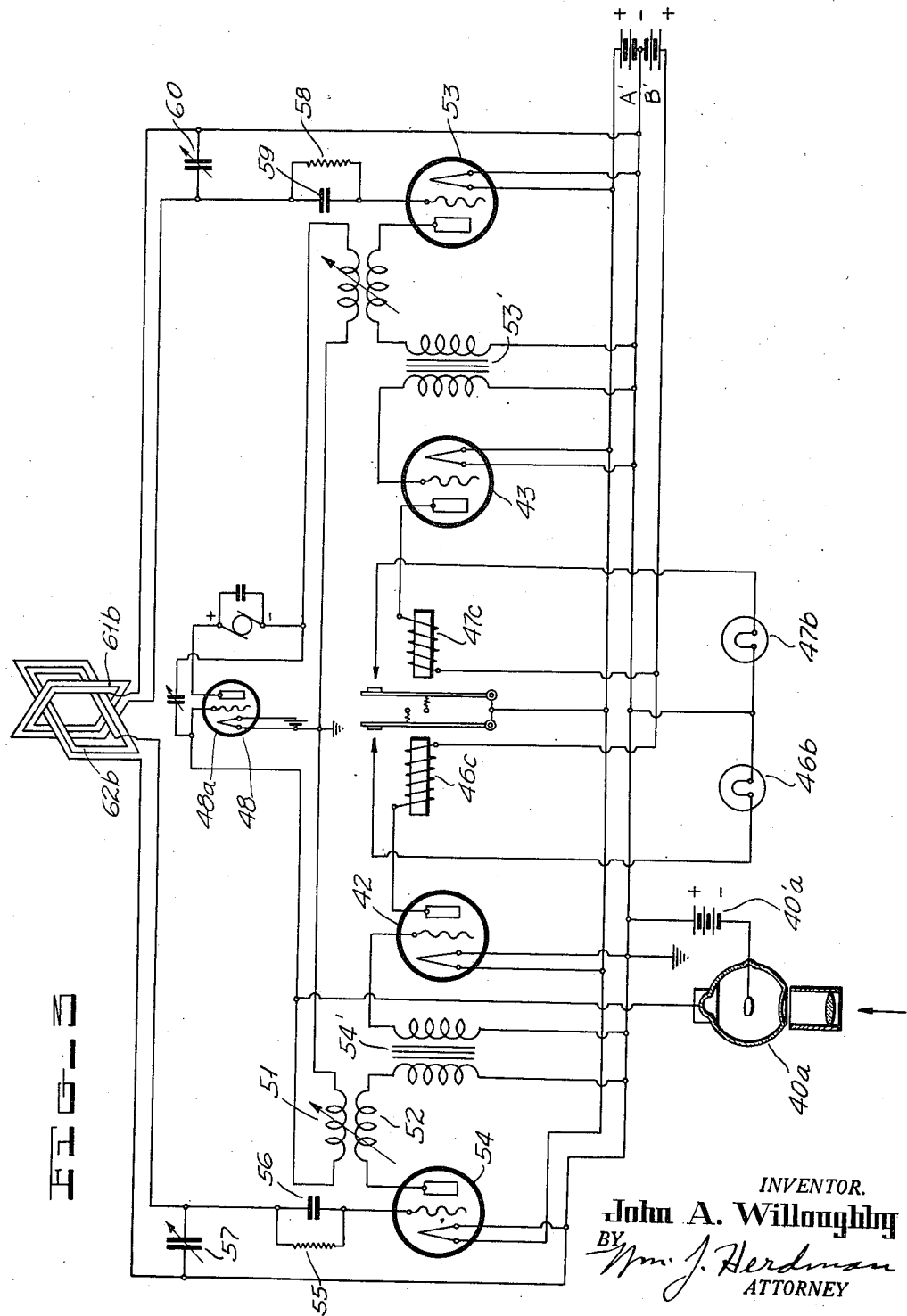

Patented Aug. 13, 1935

2,010,833

UNITED STATES PATENT OFFICE 2,010,833

RADIO NAVIGATING SYSTEM

John A. Willoughby, Washington, D. C.

Original application January 19, 1929, Serial No. 333,703, now Patent No. 1,898,474, dated February 21, 1933. Divided and this application July 16, 1932, Serial No. 622,937

14 Claims. (Cl. 250—11)

(Granted under the act of March 3, 1883, as amended April 30, 1928; 370 O. G. 757)

My invention relates broadly to apparatus for aiding navigation of aircraft and more particularly to a circuit arrangement for the receiving apparatus of a navigation system for aircraft.

This application is a division of my application Serial No. 333,703, filed January 19, 1929, entitled Aircraft landing system, which issued into Patent No. 1,898,474 on February 21, 1933.

One of the objects of my invention is to provide a receiving circuit arrangement responsive to combined radiant and radio frequency energy for guiding aircraft to a landing port and indicating the position of the landing field.

Another object of my invention is to provide a circuit arrangement for radio navigating apparatus for aircraft by which the position of the aircraft with respect to a propagated beam of radio frequency energy may be accurately determined and the location of a landing field indicated on the aircraft when the craft passes over the landing field.

Still another object of my invention is to provide a circuit arrangement for radio navigation systems on aircraft in which both the direction of travel for the aircraft and the location of the landing fields along the course of travel may be definitely indicated to the pilot.

A further object of my invention is to provide an indicator circuit for radio navigating systems operative under the combined influence of radiant and radio frequency energy for indicating both a navigable course and the position of landing fields with respect to the navigable course.

A still further object of my invention is to provide a circuit arrangement of radio navigating systems in which the functioning of an indicator on the aircraft is controlled by the combined action of radio frequency energy received from a directively propagated beam and radiant energy received from a landing field for informing the pilot of an aircraft as to the position of the aircraft under condition of fog or darkness.

Another object of my invention is to provide a circuit arrangement for an indicator for radio navigation systems in which light sensitive cells are connected to control the operation of certain of the electron tubes of an indicator circuit independently of the operation of such electron tubes by received radio frequency energy from a directively propagated beam.

Other and further objects of my invention reside in the circuit arrangement for an indicator system for aircraft as set forth more fully in the specification hereinafter following by reference to the accompanying drawings, in which:

Figure 1 is a schematic and diagrammatic view of one circuit arrangement for a radio navigating apparatus embodying my invention; Fig. 2 shows a modified circuit arrangement of increased sensitivity for an indicator system embodying my invention; and Fig. 3 shows a further modified form of indicator apparatus embodying my invention.

In the circuit arrangement of my invention, I provide radio frequency energy pick-up circuits having differing directive characteristics electrically connected with separate electron tube circuits. The separate electron tube circuits have their outputs connected with separate indicators. A generator is provided for periodically and successively energizing the plate circuits of the separate electron tube systems so that the electron tube systems are alternately operative for receiving signaling energy incident upon the radio frequency energy pick-up means. When the aircraft, on which the apparatus is arranged, is directly upon the course of a directively propagated beam of radio frequency energy, visual indicator lamps alternately glow with substantially equal intensity. If the aircraft departs from the predetermined course, one indicator lamp is caused to glow with greater intensity than the other indicator lamp according to a lateral displacement of the aircraft with respect to the directly propagated beam. My invention contemplates the location of a source of radiant energy propagated upwardly from each landing field. Light sensitive cells are arranged to control the circuits of the electron tube systems, which cells are energized when the craft moves into a position over the source of radiant energy at the landing field. Energization of the light sensitive cells serves to block the operation of the electron tube circuits and correspondingly deenergize the indicators. When the radiant energy is rendered intermittent by chopping, then the indicator lamps are caused to flicker alternately and intermittently in accordance with the action of the radio frequency energy incident upon the radio frequency energy pick-up circuits and the action of the radiant energy on the light sensitive cells connected with the electron tube circuits.

The radiant energy at each of the landing fields may be infra-red rays or visible or invisible rays which are detectible aboard the aircraft by operation of the light sensitive cells. The radiant energy transmitted from the landing field effects the operation of the apparatus on the aircraft simultaneously with the operation of the apparatus by the radio frequency energy on the directively propagated beam. In order to enable the pilot to be informed of the height of the aircraft over the landing field, electromagnetic radiation transmitted from the landing field may be caused to energize the radio frequency energy pick-up circuits on the aircraft for alternately operating the visual indicators on the aircraft when the aircraft comes within the effective area of the electromagnetic field of the landing port. Such electromagnetic radiation may be transmitted from loop antennæ on the landing port and propagated to a height of ten thousand feet or more, whereas the visible radiation may extend to a height of five thousand feet or more. The area covered by the electromagnetic radiation propagated from the loop antennæ at the landing port may have a diameter of the order of five miles at the height of five thousand feet, whereas the diameter of the area covered by the visible radiation or adjacent spectra may be only one mile at the same height.

By observing the indications of the different instruments while operating the aircraft over the landing field, the pilot or navigator will be able to determine over which portion of the field the aircraft is operating. In case of fog or darkness, the centrally located source of radiations in the visible or adjacent spectra may be caused to emit rays of high fog penetrating power which affect photoelectric cells positioned upon the aircraft and inform the pilot that the craft is over the field. Energy radiated from the loop antennæ system at the landing port is received by suitable antennæ positioned upon the aircraft and caused to operate proper signaling devices whereby the pilot determines whether the craft is moving into a more or less intense field. In case the signaling devices, operated through the action of energy transmitted from the loop antennæ system show that the craft is proceeding to an area of less intense field strength, the pilot will be informed by the signaling system receiving energy from the centrally located beacon, if the craft is progressing over the center of the field. The exact location of the landing field is thus obtained by the pilot or navigator of the aircraft. The pilot is, therefore, informed of his entry into the electromagnetic field above the landing field by the alternate flickering of the visual indicators and is informed of the position of the aircraft when centrally of the landing field by the blocking of electron tube circuits and the entinguishing of the visual indicators on the aircraft.

In Fig. 1 is illustrated a schematic circuit diagram of connections illustrating a manner in which the apparatus employed in aircraft in accordance with this invention is connected. Light sensitive cells 40 and 41 which may be of the selenium type or any other type of photoelectric cell well known in the art, are connected to the grid electrodes of the electron discharge devices 42 and 43 respectively. Coupling devices 44 and 45 are connected to the plate electrodes of electron discharge devices 42 and 43 and to the glow lamps 46 and 47 respectively. A low frequency oscillation generator 48 is coupled through inductances 49 and 51, which are included in its circuits, and the inductances 50 and 52 to the anode circuits of electron discharge devices 53 and 54 which include the inductances 50 and 52 respectively. Grid leak resistances 55 and 58 and grid condensers 56 and 59 are connected to the grid electrodes of electron discharge devices 54 and 53, respectively. Coupling devices 53' and 54' are employed to couple the anode circuits of electron discharge devices 53 and 54 to the grid circuits of devices 43 and 42, respectively. Variable condensers 57 and 60 are connected across the loop antennæ 62 and 61 respectively and to the input circuits of electron discharge devices 54 and 53, respectively. Source A' is provided for energizing the filaments of devices 42, 43, 53 and 54. Source B' is provided for energizing the photoelectric cells 40 and 41 and the anode circuits of devices 42 and 43.

In operation signals from a signal transmitting station located at an airport are intercepted equally by the directive antennæ 61 and 62 if the aircraft proceeds directly toward the transmitting station. Signaling energy from loop antenna 62 is impressed upon the input circuit of device 54. Energy from the loop 61 is impressed upon the input circuit of the device 53. When the anode of the device 54 is electrically positive with respect to the cathode by virtue of a positive potential being impressed upon it through the operation of the low frequency oscillation generator 48, energy modulated in accordance with signals impressed upon the input circuit of device 54 is impressed through the circuits of the device 42 and transformer 44 upon the glow lamp 46. Likewise when the anode of the device 53 is electrically positive with respect to its cathode and the anode of device 54 is electrically negative with respect to its cathode through the operation of the low frequency oscillation generator 48 which furnishes the excitation energy for the anode circuits of devices 53 and 54, energy modulated in accordance with signaling energy impressed upon the input circuit of device 53 is impressed upon the glow lamp 47 through the action of device 43 and transformer 45. The lamps 46 and 47 alternately glow with substantially equal intensity when the loop antennæ 61 and 62 intercept signaling energy of equal or approximately equal magnitude.

When intermittent rays of radiation impinge upon the photoelectric cells 40 and 41, positive potential is intermittently impressed upon the grid electrodes of devices 42 and 43. The glow lamps 46 and 47 are thus caused to flicker alternately and intermittently in accordance with the interrupted rays transmitted to the light sensitive cells 40 and 41.

In Fig. 2 is shown a modified form of the circuit arrangement such as illustrated in Fig. 1 wherein electron discharge devices having a plurality of grid electrodes whereby the action of the glow lamps 46 and 47 is more effectively controlled by the light sensitive cells 40 and 41 are employed. The light sensitive cells 40 and 41 are connected to the grid electrodes 42b and 43b of the devices 42a and 43a, respectively. Devices 42a and 43a may be of the shield grid type or they may be of the plural grid electrode type in which case the light sensitive cells are connected to either one of the grid electrodes. The operation of the circuit arrangement shown in Fig. 2 is substantially the same as the operation of the circuit arrangement shown in Fig. 1 in that energy collected by the directional antenna 62 is caused to affect the operation of the glow discharge lamp 46 and the energy collected by the directional antenna 61a is caused to affect the operation of the glow discharge lamp 47.

In Fig. 3 is shown a modified form of the circuit arrangement adapted for use where substantially constant radiant energy is transmitted from the source on the landing field. Photoelectric cell 40a is connected to the grid electrode of electron discharge device 48a, which is connected into the circuits of the low frequency oscillation generator 48. Relays 46c and 47c are connected to the anode electrodes of devices 42 and 43. Lamps 46b and 47b are connected into circuit with the source of current supply A' and armatures provided for the relays 46c and 47c. When signaling energies of substantially equal intensity are impressed upon the input circuits of devices 53 and 54, the circuits of both of the lamps 46b and 47b are closed alternately by virtue of the operation of the low frequency oscillation generator 48. When the aircraft proceeds over the aviation field and radiant energy such as light rays or adjacent spectra, is intercepted by the photoelectric cell 40a, the grid electrode of the device 48a receives a negative charge whereby its operation is blocked while these radiations are transmitted to the photoelectric cell 40a. The electron discharge devices 54 and 53 are not energized while the oscillation generator 48 is thus "blocked". The currents in the anode circuits of devices 42 and 43 decrease and the circuits of the lamps 46b and 47b are opened. The lamps 46b and 47b are, therefore, not energized when radiant energy is intercepted by the cell 40a.

The invention herein described, may be manufactured and used by and for the Government of the United States of America, for governmental purposes, without the payment of any royalties thereon.

What I claim as new and desire to secure by Letters Patent of the United States is as follows:

1. In a signal translating system adapted to receive signal energy, an audio frequency amplifying unit, a signal responsive device connected thereto, a source of electric signal energy, an independent source of intermittent radiant light energy, a light responsive cell connected in circuit with said audio frequency amplifying unit and means for focusing energy received from said source of intermittent radiant light energy upon said light responsive cell for interrupting the operation of said signal responsive device by said source of electric signal energy.

2. In an electron tube signal indicating system, an electron tube, circuits connecting the input of said tube to a source of electric signal energy, a source of negative biasing grid potential connected in the grid circuit of said electron tube, a signal responsive device connected in the output circuit of said electron tube, a light sensitive cell having one terminal connected to the grid of said electron tube and means responsive to signaling waves propagated intermittently and independently of said electric signaling energy, a source of potential having its positive terminal connected to the other terminal of said light sensitive cell and having its negative terminal connected to the cathode terminal of said electron tube, whereby the impinging of said intermittently propagated signaling waves upon said light sensitive cell intermittently interrupts the delivery of energy to said signal responsive device by said electron tube.

3. An indicator system for aircraft comprising radio frequency energy pickup circuits, separate electron tube systems connected with said circuits, indicators actuated by said electron tube systems and a light sensitive cell individual to the input circuit to each of said separate electron tube systems and operative under control of independently and intermittently propagated radiant energy for controlling the operation of said indicators intermittently by the radio frequency energy supplied by said pickup circuits and the said intermittently propagated radiant energy.

4. An indicator system for aircraft operation comprising light energy pickup means directional, radio frequency energy pickup means for directionally receiving radio frequency energy, an indicating mechanism connected to said directional radio frequency energy pickup means, and means operated by said light energy pickup means for intermittently blocking the operation of said indicating mechanism.

5. In an indicating system, a pair of directional signal receiving means, means including two alternately operative indicative devices connected respectively to said receiving means for showing a variable response in accordance with a variable directional relation of said receiving means with respect to signals transmitted on a given channel, and photo-sensitive means responsive to signals transmitted on a second channel for interrupting the response of said alternately operative indicative devices.

6. A system in accordance with claim 5 in which said indicative devices are gaseous discharge tubes.

7. In an indicating system, a plurality of directional antennæ, a plurality of indicating means connected respectively with said directional antennæ for variably indicating the relative amplitude of "pick-up" of radio frequency signals by said directional antennæ, and photo-sensitive means responsive to signals other than those first mentioned for intermittently suppressing the indications produced by said plurality of indicating means.

8. A system in accordance with claim 7 in which said plurality of indicating means comprises two glow tubes and operating circuits therefore such that a variable condition of said system with respect to said radio frequency signals produces an intensity of luminescence in one tube inversely proportional to that in the other tube.

9. In a system of the class described, two alternately indicative receptors of radio frequency energy, means for varying the amplitude of response in each receptor inversely with respect to the other, and photoelectric means responsive to waves propagated independently of said radio frequency energy for intermittently interrupting the operation of said receptors.

10. In a system of the class described, directional loop antennæ and means connected therewith for providing a variable indication in response to variable directional relations which said antennæ bear to a condition of propagating radio frequency signals, and means including a device responsive to heat or light waves propagated independently of said radio frequency signals for intermittently interrupting the action of the first said means.

11. In a balanced electron tube signal indicating system, a pair of electron tubes, circuits connecting the input of each of said tubes to separate sources of electric signal energy, a source of negative biasing grid potential connected in the grid circuit of each of said tubes, a signal responsive device connected to the output circuit of each of said tubes, a source of intermittently propagated light energy, a pair of light sensitive cells adapted to be focused on said source of intermittently propagated light energy each having one terminal connected to the grid of each of said electron tubes, a source of potential having its positive terminal connected to the other terminal of each of said light sensitive cells and having its negative terminal connected to the cathode terminals of said electron tubes, whereby the impinging of intermittent light energy upon said light sensitive cells interrupts the delivery of energy to said signal responsive devices by said electron tubes.

12. In an electron tube signal indicating system, a signal receiving circuit including a four-electrode electron tube having cathode, anode and two grids, circuits connecting one of said grids to a source of electric signal energy, a signal responsive device connected in the output of said electron tube, a light sensitive cell having one terminal connected to the other grid of said electron tube, and a source of potential having its positive terminal connected to the other terminal of said light sensitive cell and having its negative terminal connected to the cathode terminal of said electron tube, a similar signal receiving circuit connected with a source of electric signal energy which is variable with respect to the first mentioned source, the signal responsive device of said last mentioned circuit being disposed adjacent the signal responsive device of said first mentioned circuit for indicating the relative strength of the signal energy at said sources, said light sensitive cells constituting means whereby the impinging of intermittently propagated light signals upon said light sensitive cells successively interrupts the delivery of energy to said signal responsive devices.

13. In a balanced electron tube signal indicating system, a pair of four-electrode electron tubes each having cathode, anode, and two grids, circuits connecting one grid of each of said tubes to a source of electric signal energy, a signal responsive device connected in the output circuit of each of said electron tubes, a pair of light sensitive cells each having one terminal connected respectively to the other grid of each of said electron tubes, a source of potential having its positive terminal connected to the other terminal of each of said light sensitive cells and having its negative terminal connected to the cathode of each of said electron tubes, whereby the impinging of intermittently propagated light signals upon said light sensitive cells successively interrupts the delivery of energy to said signal responsive devices by said electron tubes.

14. In an indicator for radio navigating apparatus, an audio frequency amplifier system, an indicator connected with the output of said audio frequency amplifier system, a light sensitive cell, circuits interconnecting said light sensitive cell with said audio frequency amplifier system, means for impressing signaling energy on the input of said audio frequency amplifier system, a similar audio frequency amplifier system energized by signaling energy which is variable with respect to the signaling energy impressed on said first mentioned amplifier system, the indicators associated with each system being disposed adjacent each other for indicating the relative strength of the signal energy impressed on each system, and means for focusing intermittently propagated light rays on said light sensitive cells for intermittently blocking the operation of said amplifier systems.

JOHN A. WILLOUGHBY.